US009302206B2

(12) United States Patent
Morris et al.

(10) Patent No.: US 9,302,206 B2
(45) Date of Patent: Apr. 5, 2016

(54) FILTER ASSEMBLY

(71) Applicant: Caterpillar Inc., Peoria, IL (US)

(72) Inventors: Bryant A. Morris, Peoria, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 51 days.

(21) Appl. No.: 14/230,111

(22) Filed: Mar. 31, 2014

(65) Prior Publication Data
US 2015/0273371 A1 Oct. 1, 2015

(51) Int. Cl.
*B01D 35/30* (2006.01)
*B01D 46/00* (2006.01)
*F16L 37/14* (2006.01)
*B01D 27/08* (2006.01)
*B01D 35/16* (2006.01)

(52) U.S. Cl.
CPC ............... *B01D 35/30* (2013.01); *B01D 27/08* (2013.01); *B01D 35/16* (2013.01); *B01D 46/0002* (2013.01); *B01D 46/0004* (2013.01); *F16L 37/148* (2013.01); *B01D 2201/291* (2013.01); *B01D 2201/303* (2013.01); *B01D 2201/40* (2013.01); *B01D 2265/02* (2013.01)

(58) Field of Classification Search
CPC ............... B01D 35/30; B01D 46/0002; B01D 46/0004; B01D 2201/40; B01D 2265/02; B01D 2265/024; B01D 2265/027
See application file for complete search history.

(56) References Cited

U.S. PATENT DOCUMENTS

| 3,606,402 A | * | 9/1971 | Medney ........................ 285/305 |
| 4,427,221 A | * | 1/1984 | Shay, Jr. ................. E21B 10/18 175/340 |
| 5,820,646 A | | 10/1998 | Gillingham et al. |
| 6,343,813 B1 | * | 2/2002 | Olson et al. ................... 285/305 |
| 8,608,818 B2 | | 12/2013 | Xu et al. |
| 2004/0195834 A1 | * | 10/2004 | Steingass .............. F16L 37/148 285/321 |
| 2011/0132828 A1 | * | 6/2011 | Ries et al. ..................... 210/232 |

FOREIGN PATENT DOCUMENTS

| GB | 1496221 | 12/1977 |
| WO | 02100511 | 12/2002 |
| WO | 2004009209 | 1/2004 |
| WO | 2013023828 | 2/2013 |

* cited by examiner

Primary Examiner — Robert Clemente
(74) Attorney, Agent, or Firm — Baker & Hostetler LLP

(57) ABSTRACT

A filter assembly is provided. The filter assembly includes a first component having a first groove. The filter assembly further includes a second component having a second groove. The first groove of the first component and the second groove of the second component define a channel therebetween. Furthermore, the filter assembly includes a cord member removably inserted in the channel to detachably couple the second component to the first component.

20 Claims, 3 Drawing Sheets

US 9,302,206 B2

FILTER ASSEMBLY

TECHNICAL FIELD

The present disclosure relates to a filter assembly for filtering fluids.

BACKGROUND

Filter assemblies are known in the art for use in various applications, for example, internal combustion engines, hydraulic or pneumatic systems, and the like. These filter assemblies may be used to filter fluids in fuel systems, lubrication oil systems, hydraulic oil systems, air or exhaust filtration systems etc. There are different types of filters, such as canister type of filters, spin-on type of filters, etc. Servicing of such filter assemblies at regular intervals is important, as filter elements in these filter assemblies may tend to get clogged by impurities of the fluid being filtered, and may require replacement.

U.S. Pat. No. 5,820,646 relates to a filter device that inserts into a duct having flow passing from upstream to downstream. The filter device includes fluted filter media having flutes formed therein. The filter forms a seal between the outer edge of the filter and the downstream side of the duct. The filter media may be rolled or stacked in layers to match the shape of the duct.

SUMMARY

In an aspect of the present disclosure, a filter assembly is provided. The filter assembly includes a first component having a first groove. The filter assembly further includes a second component having a second groove. The first groove of the first component and the second groove of the second component define a channel therebetween. Furthermore, the filter assembly includes a cord member removably inserted in the channel to detachably couple the second component to the first component.

In another aspect of the present disclosure, a filter assembly is provided. The filter assembly includes a base, a housing, a filter element and a cord member. The base includes an inlet port, an outlet port and a first groove. The housing includes a second groove. The first and the second grooves define a channel therebetween. The filter element is provided at least partly within the housing and is in fluid communication with the inlet and the outlet port. The cord member is removably inserted in the channel to detachably couple the housing to the base.

In yet another aspect of the present disclosure, a replacement component for a filter assembly is provided. The replacement component includes a housing, and a filter element. The housing includes a first groove. The filter element is at least partially provided within the housing. The groove of the housing is configured to substantially align with another groove located on a base of the filter assembly to define a channel therebetween. Further, a cord member is removably inserted in the channel to detachably couple the housing to the base.

Other features and aspects of this disclosure will be apparent from the following description and the accompanying drawings.

DETAILED DESCRIPTION

Figure 1:
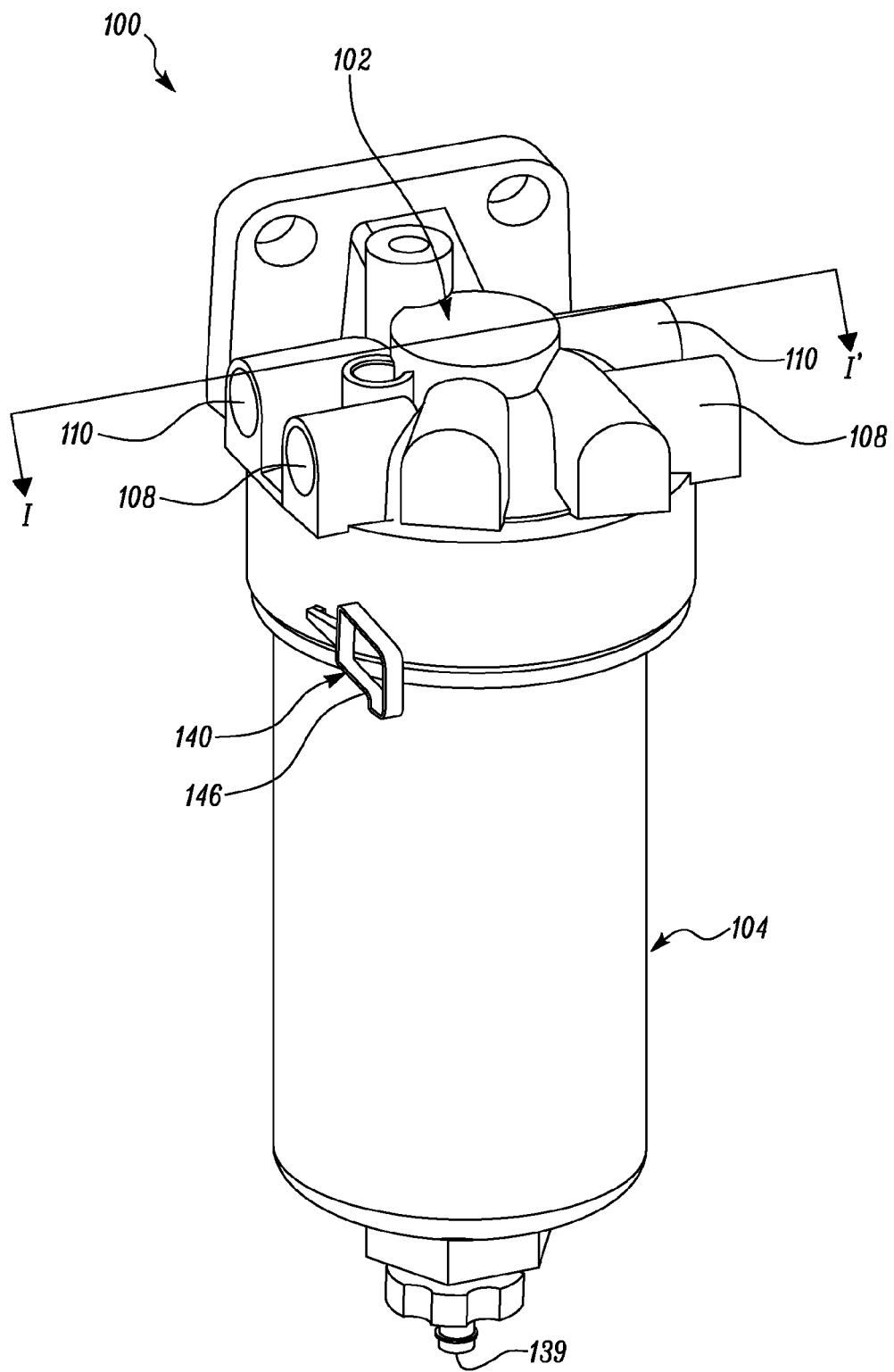
FIG. 1 illustrates a perspective view of an exemplary filter assembly, according to an embodiment of the present disclosure.

The present disclosure relates to a filter assembly. FIG. 1 illustrates a perspective view of an exemplary filter assembly 100 according to an embodiment of the present disclosure. The filter assembly 100 is embodied as a canister type filter assembly. However, in another embodiment, the filter assembly 100 may be a spin-on filter type filter assembly, or any other type of filter assembly known in the art. The filter assembly 100 may be used in equipments such as internal combustion engines, pneumatic systems, hydraulic systems, and the like. The filter assembly 100 may be used in various industrial applications, for example, construction, mining, transport, power generation, etc. The filter assembly 100 may be used to filter contaminants from fluids in fuel systems, lubrication oil systems, hydraulic fluid power systems, hydraulic fluid control systems, transmission systems, engine air intake systems, engine exhaust systems, etc. Further, the filter assembly 100 may be used to filter diesel, gasoline, hydraulic or lubrication oil or any other liquids. In other embodiments, the filter assembly 100 may be used as a water/fuel separator. Moreover, the filter assembly 100 may also be used to filter air, exhaust gases, or any other gaseous fluids.

Figure 2:
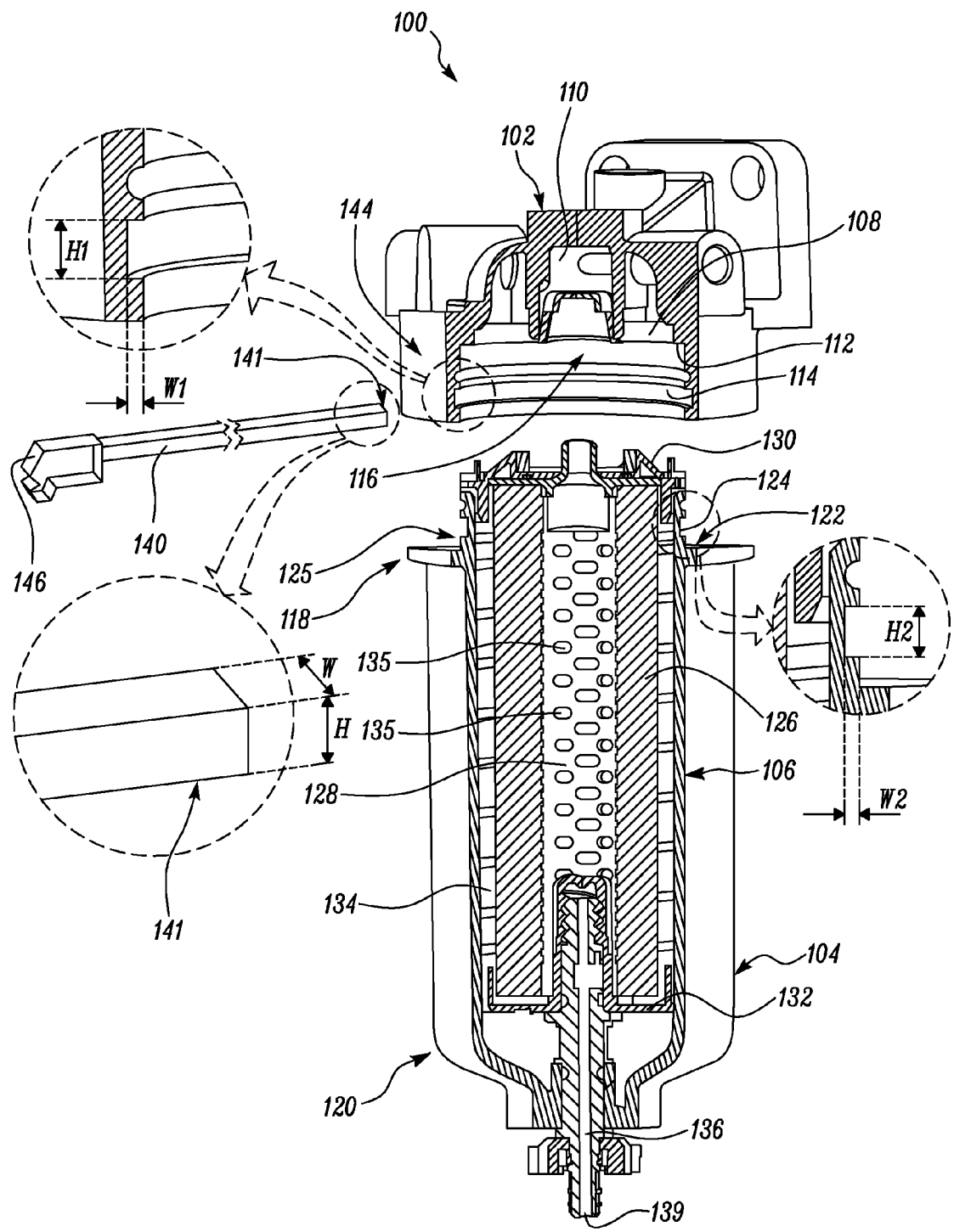
FIG. 2 illustrates a front sectional view of a disassembled filter assembly of FIG. 1.

The filter assembly 100 includes a first component 102, and a second component 104 detachably coupled to the first component 102. In an embodiment, the first component 102 is a base, hereinafter referred to as the base 102, of the filter assembly 100. The second component 104 is a housing, hereinafter referred to as the housing 104. As shown in FIGS. 1 and 2, the base 102 and the housing 104 are substantially cylindrical in shape, however, it may be contemplated that the shapes of the base 102 and the housing 104 are merely exemplary and may be varied without deviating from the scope of the claimed subject matter. For example, the base 102 and the housing 104 may have non-circular shapes, such as polygonal, elliptical, and the like.

Figure 3:
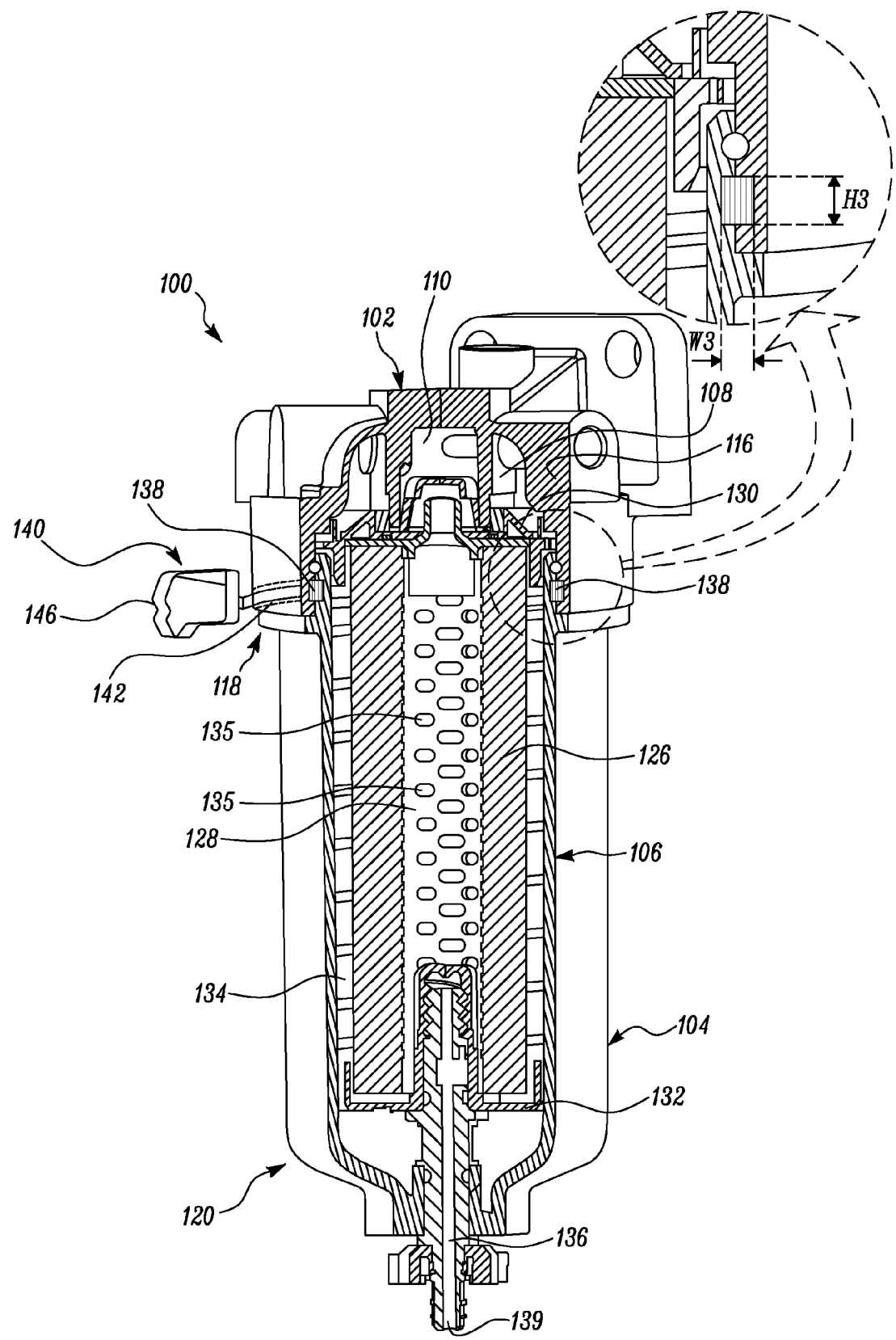
FIG. 3 illustrates a front sectional view of an assembled filter assembly of FIG. 1.

FIG. 2 illustrates a front sectional view of a disassembled filter assembly 100 along an axis I-I'. FIG. 3 illustrates a front sectional view of an assembled filter assembly 100 taken along the axis I-I', according to the embodiments of the present disclosure. As shown in FIGS. 2 and 3, the filter assembly 100 further includes a filter element 106 housed at least partially within the housing 104. In an exemplary embodiment, the filter element 106 is removably received within the housing 104, such as in a canister type filter assembly. Alternatively, the filter element 106 is fixedly received within the housing 104, such as in a spin-on type filter assembly.

As shown in FIGS. 1 to 3, the base 102 includes an inlet port 108 and an outlet port 110. The filter element 106 is configured to be in fluid communication with the inlet port 108 and the outlet port 110. The inlet port 108 is configured to facilitate fluid intake into the filter assembly 100. The outlet port 110 is configured to facilitate fluid discharge from the filter assembly 100. The base 102 further includes a stepped portion 112 having a first groove 114 disposed therein. In an exemplary embodiment, the first groove 114 may be a continuous annular groove disposed on an inner surface 116 of the stepped portion 112 of the base 102. Alternatively, the first groove 114 may be a discontinuous groove forming a cavity located on the inner surface 116 of the stepped portion 112. Further, the first groove 114 may have a substantially rectangular cross-section. Alternatively, the first groove 114 may have any other cross-sectional shape, such as circular, triangular, and the like. In an exemplary embodiment, the first groove 114 may have a height H1 and a width W1.

Further, the housing 104 includes a top end 118 and a bottom end 120. The top end 118 includes a stepped portion 122 configured to be attached to the base 102. The stepped portion 122 of the housing 104 includes a second groove 124 disposed therein. The second groove 124 is located on an outer surface 125 of the housing 104. In an exemplary embodiment, the second groove 124 may be a continuous annular groove located on the outer surface 125 of the housing 104. Alternatively, the second groove 124 may also be a discontinuous groove forming a cavity similar to the one formed by the first groove 114 as explained above. In an exemplary embodiment, the second groove 124 may have a height H2 and a width W2.

In an embodiment, the first and the second grooves 114, 124 have substantially similar cross-sections. For example, similar to the first groove 114, the second groove 124 may also have a substantially rectangular cross-section. Alternatively, the second groove 124 may have any other cross-sectional shape, such as circular, triangular, and the like. In an exemplary embodiment, the height H2 of the second groove 124 may also be equal to the height H1 of the first groove 114.

The filter element 106 includes an annularly arranged filter media 126 circumferentially surrounding a central reservoir defined by a central tube 128. Axial ends of the filter media 126 are sealed by a top end cap 130 and a bottom end cap 132. The top end cap 130 defines an axial open end of the filter element 106. The bottom end cap 132 defines an axial closed end of the filter element 106. The top end cap 130 includes an opening (not shown) configured to facilitate passage of fluid to the outlet port 110 from the central tube 128. The bottom end cap 132 is configured to prevent any fluid outside the filter element 106, adjacent to the axial end of the filter media 126, from flowing unfiltered into the central tube 128. The top and the bottom end caps 130, 132 may be joined to the central tube 128 by welding, adhesives, mechanical coupling, etc. Alternatively, some or all of the central tube 128, the top end cap 130, and the bottom end cap 132 may be constructed as unitary components.

Fluid to be filtered enters from the inlet port 108 and flows into an annular cavity 134 between the housing 104 and the filter media 126. The fluid passes into and through the filter media 126 and then into the central tube 128 via perforations 135 provided in the central tube 128. The fluid exits the central tube 128 through the top end cap 130 and the opening into the outlet port 110. As shown in FIG. 3, the top end cap 130 and the bottom end cap 132 are configured to define a fluid path for flow of the fluid into and out of the filter media 126, thereby preventing any fluid from flowing directly to the outlet port 110 and bypassing the filter media 126.

Furthermore, the filter assembly 100 includes a drain 136 releasably coupled to the bottom end 120 of the housing 104. The drain 136 provides a channel for removing the fluid inside the housing 104. An inlet end (not shown) of the drain 136 is positioned within the housing 104 and an outlet end 139 of the drain 136 is positioned outside the housing 104. The drain 136 may be moved between an open and a closed position. It may be contemplated that in the open position, the fluid within the housing 104 may be drained out via the outlet end 139 of the drain 136.

As illustrated in FIGS. 2 and 3, the base 102 and the housing 104 are detachably coupled to each other at the respective stepped portions 112 and 122. The base 102 at least partially receives the housing 104. In an exemplary embodiment, the stepped portion 112 of the base 102 abuts the stepped portion 122 of the housing 104, such that the first and the second grooves 114 and 124 are substantially aligned to form a channel 138 therebetween. In an embodiment, the channel 138 may be a continuous channel formed by the grooves 114, 124 between the base 102 and the housing 104. Alternatively, the channel 138 may be a discontinuous channel formed by the grooves 114, 124 when the base 102 and the housing 104 are coupled. It may be contemplated, that the cross-section of the channel 138 depends on the cross-section of the first and the second grooves 114, 124. For example, the cross-section of the channel 138 may be substantially rectangular, square, circular or triangular, and the like. The height H3 of the channel 138 may be equal to the height H1 and H2 of the first and the second grooves 114, 124 respectively.

In an embodiment, the filter assembly 100 includes a cord member 140 configured to be removably inserted in the channel 138 between the first and the second groove 114, 124. A leading edge 141 of the cord member 140 is inserted and/or removed to lock and/or unlock, respectively, the housing 104 with the base 102. In an exemplary embodiment, the cord member 140 may be inserted via an access passage 142 extending from the first groove 114 to an outer surface 144 of the base 102.

In an exemplary embodiment, the cord member 140 may be a spline made up of a deformable material, such as rubber, so that when inserted in the channel 138, the cord member 140 may be deformed to fit into the channel 138. Therefore, in this embodiment, a width W and/or a height H of the cord member 140 may be substantially equal to a width W3 and/or the height H3 of the channel 138 (shown in FIG. 3). It may be contemplated that the width W1 and W2 of the grooves 114, 124 may be same or different so as to be summed up to form the channel 138 of the width W3 (W1+W2=W3). In various other embodiments, the cord member 140 may be made of plastic, or metal or braided wire, etc. Therefore, in the alternative embodiments, the width W and the height H of the cord member 140 may be less than or equal to the width W3 and the height H3 of the channel 138.

The cross-section of the cord member 140 is substantially similar to the cross-section of the channel 138, the first groove 114 and the second groove 124. For example, the cross-section of the cord member 140 may be substantially rectangular, circular, etc. Further, the cord member 140 includes a grasping portion 146. As shown in FIG. 1, the grasping portion 146 projects from the access passage 142 and is configured to facilitate a user to hold the cord member 140 while inserting and removing it from the channel 138. The base 102 and the housing 104 may be further coupled by using releasable locking mechanism for the stepped portions 112, 122 of the base 102 and the housing 104 respectively, such as snap fit mechanism, threaded mechanism and/or any other mechanism known in the art.

INDUSTRIAL APPLICABILITY

The industrial applicability of the filter assembly 100 for filtering fluids and the cord member 140 will be readily understood from the foregoing discussion. The cord member 140 allows the user to easily install, assemble and service the filter assembly 100. The base 102, the housing 104 and the filter element 106 may be easily disassembled by removing the cord member 140, for example to clean or change the filter element 106. The configuration and the components of the filter assembly 100 as disclosed herein may be used in any type of filters, such as canister type or spin-on type of filters. The housing 104 and the filter element 106 may collectively be called as a replacement component of the filter assembly 100, where the replacement component may be replaced or at least detached from the base 102 for replacing the one or more components of the same.

Additionally, the stepped portion 112 of the base 102 and the stepped portion 122 of the housing 104 may be locked by using any known releasable locking mechanism and the cord member 140 strengthens the locking of the two components, thereby preventing unnecessary spinning of the filter assembly 100 during operation. Furthermore, the filter assembly 100 is easy to manufacture, and is also cost efficient. Moreover, the filter assembly 100 as disclosed herein may be utilized in any shape and size of the filter assembly 100, such as for circular or non-circular filter assemblies 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A filter assembly comprising:
   a first component comprising a first groove, the first groove being a discontinuous first groove forming a first cavity on a first surface of the first component;
   a second component comprising a second groove, the second groove being a discontinuous second groove forming a second cavity on a second surface of the second component, wherein the first cavity and the second cavity define a discontinuous channel therebetween; and
   a cord member removably inserted in the discontinuous channel defined between the first groove and the second groove to detachably couple the second component to the first component.

2. The filter assembly of claim 1, wherein the first component at least partially receives the second component therein, wherein the first groove is located on an internal surface of the first component, and wherein the second groove is located on an external surface of the second component.

3. The filter assembly of claim 2, wherein the first component comprises a stepped portion, and wherein the stepped portion abuts the second component such that the first groove and the second groove are substantially aligned to form the discontinuous channel therebetween.

4. The filter assembly of claim 1, wherein the first component further comprises an access passage extending from the first groove to an outer surface thereof.

5. The filter assembly of claim 4, wherein the cord member comprises a grasping portion configured to project from the access passage.

6. The filter assembly of claim 1, wherein a height of the first groove and the second groove is substantially equal to a height of the discontinuous channel.

7. The filter assembly of claim 1, wherein a width of the discontinuous channel is equal to a sum of a width of the first groove and a width of the second groove.

8. The filter assembly of claim 1, wherein the channel defined between the first groove and the second groove, and the cord member have substantially similar cross-sections.

9. A filter assembly comprising:
   a base comprising an inlet port, an outlet port, and a first groove, the first groove being a discontinuous first groove forming a first cavity on a first surface of the base;
   a housing comprising a second groove, the second groove being a discontinuous second groove forming a second cavity on a second surface of the housing, wherein the second cavity and the first cavity define a discontinuous channel therebetween;
   a filter element provided at least partly within the housing, wherein the filter element is in fluid communication with the inlet port and the outlet port; and
   a cord member removably inserted in the discontinuous channel defined between the first cavity and the second cavity to detachably couple the housing to the base.

10. The filter assembly of claim 9, wherein the base at least partially receives the housing therein, wherein the first groove is located on an internal surface of the base, and wherein the second groove is located on an external surface of the housing.

11. The filter assembly of claim 10, wherein the base comprises a stepped portion, and wherein the stepped portion abuts the housing such that the first groove and the second groove are substantially aligned to form the discontinuous channel therebetween.

12. The filter assembly of claim 9, wherein the base further comprises an access passage extending from the first groove to an outer surface thereof.

13. The filter assembly of claim 12, wherein the cord member comprises a grasping portion configured to project from the access passage.

14. The filter assembly of claim 9, wherein a height of the first groove and the second groove is substantially equal to a height of the discontinuous channel.

15. The filter assembly of claim 9, wherein a width of the discontinuous channel is equal to a sum of a width of the first groove and a width of the second groove.

16. The filter assembly of claim 9, wherein the discontinuous channel defined between the first groove and the second groove, and the cord member have substantially similar cross-sections.

17. The filter assembly of claim 9, wherein the filter element is removably or fixedly received within the housing.

18. A replacement component for a filter assembly, the replacement component comprising:
   a housing comprising a groove, the groove being a discontinuous groove forming a cavity on a surface of the housing; and
   a filter element at least partially provided within the housing;
   wherein the cavity on the surface of the housing is configured to substantially align with another cavity located on a base of the filter assembly to define a discontinuous channel therebetween; and
   wherein a cord member is removably inserted in the discontinuous channel defined between the cavities to detachably couple the housing to the base.

19. The replacement component of claim 18, wherein the base at least partially receives the housing therein, wherein the first groove is located on an internal surface of the base, and wherein the second groove is located on an external surface of the housing.

20. The replacement component of claim 18, wherein the filter element is removably or fixedly received within the housing.

* * * * *